US005660730A

United States Patent [19]

Lucchese et al.

[11] Patent Number: 5,660,730
[45] Date of Patent: Aug. 26, 1997

[54] INERTIZATION OF LIQUID WASTE, MUD AND SOLID WASTE CONTAINING HEAVY METALS BY SULPHATE-REDUCING BACTERIA

[75] Inventors: Giuseppe Lucchese, Monterotondo; Andrea Robertiello, Rome; Giuseppe Scolla, Vicovaro, all of Italy

[73] Assignee: Eniricerche S.p.A., Milan, Italy

[21] Appl. No.: 499,659

[22] Filed: Jul. 7, 1995

[30] Foreign Application Priority Data

Jul. 13, 1994 [IT] Italy ................... MI94A1448
Jul. 13, 1994 [IT] Italy ................... MI94A1450

[51] Int. Cl.$^6$ .................................................. C02F 3/34
[52] U.S. Cl. ........................ 210/611; 210/631; 210/912; 210/913
[58] Field of Search .......................... 210/605, 610, 210/611, 612, 613, 630, 631, 912–914

[56] References Cited

U.S. PATENT DOCUMENTS

| 3,961,078 | 6/1976 | Stitt ................................. 210/610 |
| 4,450,908 | 5/1984 | Hitzman ........................... 166/246 |
| 4,584,271 | 4/1986 | Stern et al. ..................... 210/611 |
| 4,919,813 | 4/1990 | Weaver ............................ 210/610 |

FOREIGN PATENT DOCUMENTS 0 436 254   7/1991   European Pat. Off. .

*Primary Examiner*—Thomas G. Wyse
*Attorney, Agent, or Firm*—Oblon, Spivak, McClelland, Maier & Neustadt, P.C.

[57] ABSTRACT

Process for the inertization of liquid waste, mud and solid waste, containing sulphates and heavy metals, which comprises a neutralization step of the compounds to be treated and an anaerobic reduction step of the sulphate ion to allow the formation of sulphide ions necessary for the process. A consortium of sulphate-reducing bacteria and lactobacilli is used, with whey as a carbon and nitrogen source.

9 Claims, No Drawings

INERTIZATION OF LIQUID WASTE, MUD AND SOLID WASTE CONTAINING HEAVY METALS BY SULPHATE-REDUCING BACTERIA

The present invention relates to the treatment by sulphate-reducing bacteria of liquid waste, mud and solid waste and soil contaminated by heavy metals.

The presence of toxic heavy metals in liquid waste, mud, solid waste and powders creates problems of their disposal when discharged.

Among waste products of interest many are characterized by a high content of sulphates as well as heavy metals. For example mud deriving from the production of chlorine and sodium hydroxide, slag from the production of secondary lead, chalk from the production of zinc, powder from incineration ovens.

In Italy at present, there are eleven operative production plants of chlorine and sodium hydroxide by the electrochemical cleavage of sodium chloride (chlorine/soda). There are many technical and environmental problems which characterize the production of chlorine/soda. In this context however we only want to mention that the typical environmental problems are related to the presence of mercury and the necessity of disposing of a considerable quantity of solid waste (mud) deposited during temporary storage in various establishments.

The method presently used for disposing of mercurial mud generated by the production of chlorine/soda is to send the mud to controlled landfill areas: of the type 2B, after inertization (with thiourea-sulphur or hydraulic ligands), or in 2C-type landfills.

The limited availability and cost of 2C-type landfills, the uncertainty of the inertization processes available if applied to the waste in question and the considerable quantities of mercurial mud to be disposed of, on the whole tend to direct research towards making new technologies available.

Another type of solid waste containing heavy metals is ash coming from the pyroscission process with the direct heating of mud deriving from the petroleum and petrolchemical industries. This type of waste is made inert by its insertion in cement and subsequent discharge. This treatment however is not always effective. Recent specifications in scientific and patent literature show how it is possible to effectively transform the ions of heavy metals, present in contaminated water and soil, into insoluble and inert sulphides by the action of anaerobic sulphate-reducing bacteria.

Scientific literature in the last few years describes the use of anaerobic sulphate-reducing bacteria which are capable of growing on specific carbonaceous substrates transforming the sulphates into sulphides. If heavy metals are present in the culture medium, these are transformed into sulphides which, in most cases, are insoluble and inert.

Patent application EP 436254 of Shell describes a process for the treatment of liquid waste, also containing heavy metals, which involves the use of SRBs capable of using ethanol which is oxidated and acetated, combined with methanogen bacteria for the oxidation of the acetate to carbon dioxide.

It has been proved that the hydrogen sulphide produced by the sulphate-reducing bacteria is much more effective, as a precipitating agent, than the analogous product chemically produced, operating as an insolubilizing agent also at pH values which are almost neutral.

We have now surprisingly found that an anaerobic treatment, by means of sulphate-reducing bacteria in co-culture with lactobacilli which use whey as a carbon and nitrogen source, makes it possible to transform heavy metal ions present in liquid waste, mud and solid waste, into insoluble and inert sulphides.

In accordance with this, the present invention relates to a process for the treatment of liquid waste, mud and solid waste containing sulphates and heavy metals which comprises:

a neutralization step at a pH of between 3 and 10;

an anaerobic reduction step of the sulphate ion at a temperature between 20° and 70° C. for a period of between 5 and 30 days;

characterized in that said reduction step is carried out by means of a consortium of sulphate-reducing bacteria and lactobacilli and that whey is added to the reaction mixture as the only source of carbon and nitrogen.

In the first step of the process, in the case of solid waste, an appropriate quantity of water is first added to obtain a salinity which is suitable for bacterial growth and a neutralization is then carried out using a strong acid, preferably sulphuric acid, or a base, preferably calcium oxide, to bring the pH of the mud to between 3 and 10. Under preferred conditions, the pH is between 6 and 7.5. A neutralization is carried out directly on the waste, without dilution, using a strong acid, preferably sulphuric acid, or a base, preferably calcium oxide, to bring the pH to between 3 and 10. Under preferred conditions the pH is between 6 and 7.5. The anaerobic step is carried out in hermetically closed reactors cultivating a suitable mixed microbic flora in anaerobic conditions.

The microbic flora is selected as follows.

From a bacterial mixture comprising SRBs and methanogens, taken from a normal anaerobic digester used for the treatment of urban mud, SRBs (without methanogens) are first selected by the addition of specific culture mediums with lactate as the carbon source. The composition of the medium is the following:

| | |
|---|---|
| Sodium lactate | 2 g per liter |
| $NH_4Cl$ | 0.5 g per liter |
| NaCl | 1 g per liter |
| Na sulphate | 1 g per liter |
| phosphoric acid | 1 g per liter |
| Mg sulphate | 0.25 g per liter |
| CaCl | 0.1 g per liter |
| Fe sulphate | 0.1 g per liter |
| Cu sulphate | 0.05 g per liter |
| pH 7.4 | |

In this way a microbic flora is selected which is prevalently SRB lactate dependent. The reactor is then fed with said culture mediums until a constant correspondence between the quantity of oxidated lactate and reduced sulphates is registered together with the absence of methane in the biogas produced. After this selection phase of the SRBs, the lactate is gradually substituted, in the medium fed to the anaerobic reactor, with whey (lactose as carbon source) so as to select the SRB—lactobacilli consortium. It is known in fact that SRBs are not capable of metabolizing lactose and that only the presence of lactobacilli, which transform the lactose into lactic acid, can permit its survival and multiplication.

In practice, this selection is carried out by continuously running a small anaerobic plant of the filter type with an inert support consisting of synthesized borosilicate glass rings. The volume of the reactor was 1,200 ml with a used volume of about 700 ml. The temperature of 37° C. was maintained with water circulation coming from a thermostat-regulated bath, the pH was controlled at the outlet so that if this parameter exceeded the limit of 8 it was possible to acidify the incoming stream by suitable additions of $H_2SO_4$ 0.1M, the redox potential was controlled inside the reactor.

After about 30 days of flora selection, the plant was activated in continuous operating with an initial stream of 20 ml/hour. The inlet medium used during this phase contained 600 ppm of sulphates and progressive quantities of whey as a carbon source, instead of lactic acid and acetic acid. The whey also acts in the system as the inoculum for the lactobacilli and the nitrogen source.

To measure the capacity of the system the flow rate of the medium at the inlet was slowly increased to 200 ml/hour in order to obtain a retention time of about three hours. On the basis of the data collected it can be estimated that the system was capable of separating 4.8 kg of sulphates per $m^3$ of reactor a day.

At this stage, by stopping the feeding to the reactor, used for the waste treatment, for a few seconds, it was possible to remove from the bottom thereof, inocula of the consortium of sulphate-reducers and lactobacilli suitable for the inertization treatment of the present invention.

The following examples provide a better understanding of the invention but do not limit it in any way.

EXAMPLE 1

Mud generated from a plant for the production of chlorine and sodium hydroxide by electrolytic cleavage of the sodium chloride was removed from the storage tanks.

Various data are given below which characterize the type of mud produced in these plants.

Typical composition of the mercurial mud:

| | |
|---|---|
| Water | 38.5–48.5% |
| Chlorides | 4.3–6.5% |
| Sulphates | 0.98–1.4% |
| $Iron^{3+}$ | 0.9–1.9% |
| Silica | 16.3–20.1% |
| $Calcium^{2+}$ (as oxide) | 13.4–16.5% |
| $Magnesium^{2+}$ (as oxide) | 0.3–0.8% |
| $Mercury^{2+}$ | 0.03–0.079% |
| $Arsenic^{3+}$ | 0.001% |

The material, as received from the plant, was conserved at room temperature in plastic 30 l barrels. It was analyzed to determine the total content of mercury and iron after complete dissolution in aqua regia. Again for analytical purposes, the water was separated from the solid material, by filtration of the mud. On the former, the mercury content was determined; the content of dry substance and ash was evaluated on the solid.

The determination of the concentrations of the mercury and iron ions was carried out by atomic absorption spectrometry.

Leaching tests of the inertized solid material, obtained after biological treatment, were carried out in accordance with the law methods (CEE directive No. 78/319-DPR 915/1982).

All the other analytical determinations were carried out in accordance with the Standard Methods 15th edition 1980.

The results of the analyses carried out on the material used in the experiments are summarized in table 1.

Examination of the results indicated shows how the material of the experiment:

consists of a suspension of about 50% of water and cannot therefore be placed in any kind of discharge unit as it cannot be removed with a shovel;

should be classified as harmful-toxic waste as the concentration of mercury is higher than the limit values indicated by law.

In this context it is interesting to note that the concentration of the mercury ion (see Table 1) in the surnatant waters (alkaline) is already higher than that estimated from the (acid) cession tests foreseen by the DPR 915 (0.103 against 0.005 ppm). On the other hand, on carrying out the leaching test on the material in question, it was necessary to use, for 170 g of mud as such (100 g of dry product), 2280 ml of solution of acetic acid 0.5M.

TABLE 1

| Mercurial mud as such: | |
|---|---|
| Dry substance | 59.97% |
| Water | 42.03% |
| $Hg^{2+}$ | 600–1000 ppm (after aquaregia attack) |
| $Fe^{3+}$ | 5000–6000 ppm (after aquaregia attack) |
| Solid obtained by filtration (85.50% of the total): | |
| Dry substance | 66.50% |
| Water | 33.50% |
| Ash (Fixed residue at 550° C.) | 63.04% |
| Liquid obtained by filtration (14.50% of the total): | |
| Dry substance | 6.92% |
| Water | 93.18% |
| Ash (Fixed residue at 550° C.) | 6.17% |
| $Hg^{2+}$ | 0.103 ppm |
| pH | 9.4 |

This quantity of acid, much greater than that anticipated by the test imposed by Italian Law (400 ml) for which the waste product must in any case be considered as being harmful-toxic, is consumed by the high alkalinity which characterizes the chlorine-soda mud.

All the tests of direct biological inertization of the mercurial mud were carried out using hermetically closed 500 ml Duran bottles into which 170 g of material as such (100 g of dry substance) were initially introduced. 50 ml of water and 33 ml of 5N sulphuric acid were added until a pH of 7 was obtained. Water was then added to the suspension thus obtained up to a final volume of 200 ml. As inoculum 20 ml of a culture broth containing SRBs and lactobacilli obtained as shown in the description, were used. The quantity of Sulphate-Reducing Bacteria present in the inoculum was estimated at $10^8$ UFC/ml.

The nutrients consisted of: phosphoric acid at 85% as a phosphorous source (in such a quantity as to obtain a final concentration of the culture medium of 1 g/l); whey in powder form as a carbon and nitrogen source (in such a quantity as to obtain a final concentration in the culture medium of 5 g/l).

To ensure that the anaerobic conditions of the medium were rapidly reached, 0.5 g/l of cysteine hydrochloride were added.

The Duran bottles, prepared as described above, were hermetically sealed and left to incubate at 35° C. for 30 days in a static medium.

After this period, the liquid was separated from the solid by filtration and the colour of the latter changed, during the treatment, from off-white to anthracite grey.

Analysis of the liquid showed the presence of 0.002 ppm of mercury and 0.23 ppm of iron, confirming the insolubilization action in the form of sulphides effected by the SRBs. Analyses carried out on the solid showed however that this material still had to be classified as harmful-toxic owing to the necessity of adding, in the leaching tests, a quantity of acetic acid which was much higher than that required (1600 ml of acetic acid 0.5M). It is interesting to note however that the concentration of the mercury ion in the leached product was less than 0.005 ppm.

EXAMPLES 2-4

A sample of mud was treated as described in example 1 with the following modifications.

In the neutralization step the pH was brought to a value of 6 by the addition of 150 ml of sulphuric acid 5N.

The anaerobic treatment was carried out for 10, 20 and 30 days.

The microbic consortium comprising the SRBs proved capable of operating also at such low pHs, in fact growths of more than $10^8$ cells per ml of culture were obtained. Analyses carried out on the liquid obtained by filtration after 10 days of incubation showed the presence of 0.007 ppm of mercury and 24 ppm of iron, values which for the mercury were slightly (7 ppb against 5 ppb) higher than those accepted by law. Analyses carried out on the solid showed on the other hand that the material could be classified as special-type waste, as from the leaching test 275 ml of acetic acid 0.5M were used thus remaining below the established limit; there were no concentrations of mercury which were higher than those established by the laws presently in force.

Analyses carried out on both the liquid fraction and solid fraction subjected to leaching tests, on samples taken after 20 and 30 days of incubation gave values which were perfectly in line with the law in force thus confirming that an effective inertization of the mercurial mud from chlorine/soda had been obtained.

EXAMPLE 5

Ash, generated from a pyroscission plant with the direct heating of mud coming from the petroleum and petrolchemical industry, was analyzed to determine the content of metallic ions.

The material consisted of a dry, heterogeneous, white powder, classified as harmful-toxic waste as the concentration of heavy metals was higher than the limit values established by law.

The characterization of the material is the following:

| | |
|---|---|
| Ca | 7.42% |
| Mg | 1.54% |
| Na | 3.61% |
| K | 3.77% |
| Fe | 9.09% |
| Cr | 0.17% |
| Al | 0.34% |
| Ti | 0.21% |
| Sn | 0.77% |
| Pb | 1.06% |
| Zn | 2.06% |
| $SiO_2$ | 14.97% |
| sulphates | 45.80% |
| Cd | 7 mg per Kg |
| Cu | 1303 mg per Kg |

A 25 g sample of this material was placed in a 500 ml hermetically closed Duran bottle. 250 ml of water were added to obtain a suspension at a pH of between 1 and 4. The sample was brought to a pH of about 7 with CaO and left under stirring for 24 hours. As inoculum 25 ml of a culture broth containing SRBs and lactobacilli obtained as indicated in the description, were used. The quantity of SRBs present in the inoculum was estimated at $10^8$ UFC/ml.

The nutrients consisted of: phosphoric acid at 85% as a phosphorous source (addition in such quantities as to obtain a final concentration in the culture medium of 1 g/l); whey in powder form as a carbon and nitrogen source (addition in such a quantity as to obtain a final concentration in the culture medium of 7 g/l).

To ensure that the anaerobic conditions of the medium were rapidly reached, 0.5 g/l of cysteine hydrochloride were added.

The Duran bottles, prepared as described above, were hermetically sealed and left to incubate at 35° C. for 10 days in a static medium.

The liquid was separated from the solid by filtration. The liquid was directly analyzed by atomic absorption spectroscopy, whereas the solid was subjected to leaching tests with solutions of acetic acid 0.5M. Analyses of the metal content of the liquid and solid (on the surnatant after leaching) (see table 2) showed the presence of heavy metals in a lower concentration than that established by the Italian law, thus confirming the insolubilization action of the heavy metals in the form of sulphides.

TABLE 2

| | liquid (ppm) | solid (ppm) |
|---|---|---|
| Cd | <0.02 | <0.02 |
| Cr | <0.2 | <0.2 |
| Cu | <0.1 | <0.1 |
| Pb | <0.2 | <0.2 |
| Sn | <10 | <10 |
| Zn | <0.5 | <0.5 |

EXAMPLE 6

A reactor is prepared, consisting of a jacketed anaerobic filter with a total volume of 1200 ml of which 485 are occupied by synthetized borosilicate glass rings of about 1 cm in diameter.

The reactor is initially inoculated with 200 ml of a suspension taken from the outlet of an anaerobic digester used for the treatment of urban mud. The SRB-lactobacilli consortium is then selected using mediums which contain, as well as sulphates, first lactate and then whey as a carbon source, as indicated in the description. The feeding of the reactor is in up-flow, the temperature is 37° C. To avoid the growth of the SRBs being inhibited by a high concentration of hydrogen sulphorate, the reactor is equipped with a recycle of 5 liters/hour which passes through a settler into which nitrogen is insufflated.

After about 40 days of feeding firstly in semi-continuous and then in continuous at a final flow rate of 50 ml/hour, both the absence of methane in the biogas and the perfect correspondence between oxidated lactate and reduced sulphate are observed. After this period the fed medium was gradually replaced with a medium containing whey.

After 30 days of continuous running with a flow rate of 50 ml/hour, when the consortium has been obtained, the reactor is fed with two lines. The first is used for the inlet, with a flow rate of 30 ml/hour, of liquid waste generated from the processing of primary zinc containing sulphates whose pH, which is 1.8, is brought to 2.8–3 by the addition of NaOH. The second is used for the inlet, with a flow rate of 60 ml/hour, of the medium with the nutrients: whey (as a carbon and nitrogen source) and phosphorous. The pH of the nutritive medium is brought to 10 so that, by mixing with the waste, the pH inside the reactor is about 7.

Table 3 shows the data relating to the streams entering and leaving the anaerobic treatment.

TABLE 3

| ions | inlet (ppm) | outlet (ppm) | Italian law (ppm) |
| --- | --- | --- | --- |
| Fe | 50 | <0.2 | 2 |
| Mn | 50 | <1.7 | 2 |
| Cu | 9 | <0.1 | 0.1 |
| Zn | 470 | 0.5 | 0.5 |
| Co | 0.1 | <0.01 | |
| As | 0.12 | 0.038 | 0.5 |
| Cd | 88 | 0.1 | 0.02 |
| Ni | 20 | 0.02 | 2 |
| Pb | 0.5 | 0.2 | 0.2 |
| K | 0.1 | n.d. | |
| pH | 7 | 7.2 | 5.5–9.5 |

As can be observed, all the heavy metals are in a concentration which is within the limits established by the Italian law.

EXAMPLE 7

An anaerobic reactor containing the SRB-lactobacilli consortium as described in example 6 is fed, with a flow rate of 90 ml/hour, with industrial waste containing sulphates, generated from the production of lead and primary zinc, to which 2.5 g/l of whey has been added and brought to a pH of 10 with phosphoric acid (original pH 11.8).

TABLE 4

| metal | inlet (ppm) | outlet (ppm) | Italian law (ppm) |
| --- | --- | --- | --- |
| Pb | 24 | <0.2 | 0.2 |
| Al | 1.97 | 0.23 | 1 |
| Cd | 0.47 | <0.01 | 0.02 |
| Zn | 1.68 | <0.5 | 0.5 |
| pH | 10 | 6.5 | |

All the operations are identical to those described in example 6, simplified in the initial phases in that there is not the necessity of using two separate feeding lines to the reactor.

Table 4 shows the data relating to the composition of the streams entering and leaving the anaerobic treatment. As can be seen the heavy metals were precipitated and the outgoing waste conforms to the regulations in force.

EXAMPLE 8

A 5.5 liter anaerobic reactor of the UASB type (Upflow Anaerobic Sludge Blanket) is set up, thermostat-regulated at 35° C. The reactor is inoculated with 1500 ml of anaerobic mud taken from the same digester described in example 6.

The SRB-lactobacilli consortium is then selected, operating in the same way as example 6.

The formation of the consortium was carried out controlling: the separation of the sulphate ion leaving the reactor; the absence of methane in the biogas; the number of cells of sulphate-reducing bacteria present in the UASB reactor bed.

When the microbic flora had been stabilized (number of SRBs >$10^8$ cells/ml) the industrial waste of examples 6 and 7 was fed in continuous into the reactor reaching a flow rate of 400 ml/hour.

The effluent leaving the anaerobic reactor was passed through a decanter to remove the solid particles and sulphides formed during the process.

The results of the analyses carried out on the effluents leaving the decanter showed separations of the heavy metals completely analogous to those described in examples 6 and 7.

We claim:

1. A process for the treatment of liquid waste, mud, solid waste or soil containing sulfates and heavy metals or both, which comprises:

a) neutralizing said liquid waste, mud, solid waste or soil containing said sulfates and heavy metals to a pH of between about 3 and 10; and b) anaerobically reducing said sulfates at a temperature between about 20° and 70° C. for between about 5 and 30 days;

wherein said anaerobic reduction is carried out by a mixture of sulfate-reducing bacteria and lactobacilli, and further wherein whey is added to the reaction mixture as a carbon and nitrogen source.

2. The process of claim 1, wherein the neutralization is effected by sulphuric acid or calcium oxide.

3. The process of claim 1, wherein the neutralization effects a pH of between about 6 and 7.5.

4. The process of claim 1, wherein the anaerobic reduction is effected at a temperature of about 35° C.

5. The process of claim 1, wherein said mud results from production of chlorine and sodium hydroxide.

6. The process of claim 1, wherein said solid waste is selected from the group consisting of slag from production of secondary lead, chalk from production of zinc, and powder from incineration ovens.

7. The process of claim 1, which produces a product which contains, in ppm:

| | |
| --- | --- |
| Cd < 0.02 | Pb < 0.2 |
| Cr < 0.2 | Sn < 10 |
| Cu < 0.1 | Zn < 0.5. |

8. The process of claim 1, wherein said sulfate-reducing bacteria is lactate dependent.

9. The process of claim 1, which produces a product which contains metals in amounts of less than, in ppm:

| | |
| --- | --- |
| Fe < 2 | As < 0.5 |
| Mn < 2 | Cd < 0.02 |
| Cu < 0.1 | Ni < 2 |
| Zn < 0.5 | Pb no more than 2. |

* * * * *